US006970400B1

(12) United States Patent
Wakabayashi et al.

(10) Patent No.: US 6,970,400 B1
(45) Date of Patent: Nov. 29, 2005

(54) INFORMATION RECORDING MEDIUM WITH MAGNETIC MARKS, RECORDING AND REPRODUCING APPARATUS THEREFOR, AND HEAD POSITIONING METHOD USING DETECTED MAGNETIC LEAKAGE FIELDS FROM THE MAGNETIC MARKS

(75) Inventors: Kouichirou Wakabayashi, Toride (JP); Tsuyoshi Onuma, Kitasoma-gun (JP); Teruaki Takeuchi, Kitasoma-gun (JP); Nobuyuki Inaba, Hasuda (JP); Fumiyoshi Kirino, Suginami-ku (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/671,478

(22) Filed: Sep. 27, 2000

(30) Foreign Application Priority Data

Sep. 27, 1999 (JP) .................................. 11-271728
Dec. 16, 1999 (JP) .................................. 11-356857

(51) Int. Cl.$^7$ ............................................. G11B 11/00
(52) U.S. Cl. ................................. 369/13.02; 369/13.22
(58) Field of Search ................ 363/13, 32; 369/13.22, 369/13, 2

(56) References Cited

U.S. PATENT DOCUMENTS

| | | | | |
|---|---|---|---|---|
| 4,924,334 | A | * | 5/1990 | Diepers et al. .......... 360/77.07 |
| 5,339,204 | A | * | 8/1994 | James et al. ................... 360/51 |
| 5,371,725 | A | * | 12/1994 | Yanagawa et al. ........ 369/44.28 |
| 5,455,815 | A | * | 10/1995 | Ishida et al. ................... 369/60 |
| 5,473,584 | A | * | 12/1995 | Oshima ........................ 369/32 |
| 5,521,900 | A | * | 5/1996 | Ando et al. .............. 369/275.1 |
| 5,615,065 | A | * | 3/1997 | Cheung .................... 360/77.08 |
| 5,978,350 | A | * | 11/1999 | Tobita et al. ............ 369/275.3 |
| 5,986,977 | A | * | 11/1999 | Birukawa et al. | |
| 6,018,512 | A | * | 1/2000 | Belser ........................ 369/281 |
| 6,058,084 | A | * | 5/2000 | Yamamoto et al. | |

(Continued)

FOREIGN PATENT DOCUMENTS

JP 62-043816 2/1987

(Continued)

OTHER PUBLICATIONS

MAT (machine assited translation) JP 10-021598.*

(Continued)

*Primary Examiner*—A M Psitos
(74) *Attorney, Agent, or Firm*—Oliff & Berridge, PLC (57) ABSTRACT

A recording and reproducing apparatus including a recording magnetic head and a reproducing magnetic head with their floating height lowered for high density recordation and reproduction is provided. An information recording medium is provided on which it is possible to densely record information and from which it is possible to densely reproduce information by lowering the floating height of the recording and reproducing heads. The information recording medium includes a flat substrate and a recording layer provided on the substrate. Servo patterns and management information are recorded as magnetic marks on the recording layer in advance by a servo writer or the like. Because the substrate needs no recessed and embossed patterns formed in it, the slider of the recording and reproducing apparatus can be floated at a constant floating height lower than conventionally over the whole area of the medium. During information recordation, the position of the slider is controlled on the basis of the magneto-optical signals from the magnetic marks. During information reproduction, the reproducing magnetic head controls the slider position on the basis of the magnetic leakage fields leaking from the magnetic marks.

15 Claims, 8 Drawing Sheets

U.S. PATENT DOCUMENTS

| | | | |
|---|---|---|---|
| 6,226,233 B1 * | 5/2001 | McDaniel et al. ....... | 369/13.32 |
| 6,266,299 B1 * | 7/2001 | Oshima et al. | |
| 6,269,056 B1 * | 7/2001 | Birukawa et al. | |
| 6,288,981 B1 * | 9/2001 | Yoshida et al. .......... | 369/13.17 |
| 6,304,407 B1 * | 10/2001 | Baker et al. .................. | 360/75 |
| 6,314,062 B1 * | 11/2001 | Suzuki et al. | |
| 6,345,021 B1 * | 2/2002 | Belser et al. ............... | 369/47.1 |
| 6,396,774 B1 * | 5/2002 | Matsumoto et al. ..... | 369/13.02 |
| 6,507,540 B1 * | 1/2003 | Berg et al. ................ | 369/13.13 |
| 6,560,168 B1 * | 5/2003 | Saga et al. ............... | 369/13.01 |

FOREIGN PATENT DOCUMENTS

| | | | | |
|---|---|---|---|---|
| JP | 2-218016 | 8/1990 | | |
| JP | 3-201215 | 9/1991 | | |
| JP | 10-021598 | * | 1/1998 | ........... G11B 11/10 |
| JP | 11-213420 | 8/1999 | | |
| JP | 2000-182291 | * | 6/2000 | |
| WO | WO98/27553 | * | 6/1998 | |
| WO | WO00/14733 | 3/2000 | | |

OTHER PUBLICATIONS

Servo Pattering of Magneto-Optical Disks, IBM Techincal Disclosure Bulletin, Mar. 1989, vol. 31, No. 10, pp. 378-379. Mar. 1, 1989.*

"Proceedings of Magneto-Optical Recording, International Symposium '99", pp. 225-228.

Harada, M., "Distinctive Integration of Technologies for Optical Disk Apparatus and HDD Apparatus," *Nikkei Electronics*, Jan. 11, 1999 (No. 734), pp. 35-42 (w/Appendix).

* cited by examiner

INFORMATION RECORDING MEDIUM WITH MAGNETIC MARKS, RECORDING AND REPRODUCING APPARATUS THEREFOR, AND HEAD POSITIONING METHOD USING DETECTED MAGNETIC LEAKAGE FIELDS FROM THE MAGNETIC MARKS

BACKGROUND OF THE INVENTION

1. Field of the Invention

The present invention relates to an information recording medium on which it is possible to record information as a magnetic mark by applying light and an external magnetic field to the medium, and from which it is possible to reproduce the recorded information by detecting the magnetic leakage field leaking from the magnetic mark. This invention also relates to an apparatus for recording information on and reproducing information from such a recording medium. The invention further relates to a method for positioning a head of such a recording and reproducing apparatus. More specifically, the invention relates to an information recording medium which can prevent the head crashes caused by the contact of the recording head or the reproducing head of a recording and reproducing apparatus with the recording medium, and to a novel recording and reproducing apparatus and a novel head positioning method which can reliably position the recording and reproducing heads at target code tracks of an information recording medium.

2. Description of Related Art

Magneto-optical disks and other magneto-optical recording media are known as external memories for computers etc. It is possible to rewrite information and record a great quantity of data such as voice and dynamic images on magneto-optical recording media. Therefore, magneto-optical recording media are used widely as recording media in the multimedia age. The recordation of information on a magneto-optical recording medium involves condensing a laser beam on the recording medium through a converging lens to form a light spot on the medium, in order to heat the recording medium locally by means of the light spot, and applying a magnetic field corresponding to the information to the heated region to record an information mark on a code track (information track) of the recording medium. The reproduction of information from a magneto-optical recording medium involves irradiating an information mark region of the recording medium with a laser beam lower in laser power than the laser beam for recordation, and detecting a magneto-optical effect depending on whether an information mark is present or absent in the region.

For higher recording density of a magneto-optical recording medium, its code tracks may have a narrower track pitch, and information marks may be lined at a narrower mark pitch in the direction of the scanning of the recording medium with a light spot. There may be a case where the track pitch and/or the mark pitch are/is smaller than the diameter of the light spot. In this case, however, at the same time that one of the information marks is irradiated with the light spot, one or more of the adjacent information marks are partially irradiated. Consequently, the signal or signals reproduced from the adjacent wrong mark or marks leak into the signal reproduced from the right mark. The leakage interferes as one or more noise components with the signal reproduced from the right mark, and consequently lowers the reproducing space resolution. This prevents information from being accurately reproduced from the recording medium. Accordingly, the spot diameter limits the track and mark pitches.

If a converging lens having a numerical aperture NA forms a light spot of a laser beam having a wavelength$\lambda$, the diameter Ws of the spot is represented generally by the value$\lambda$/NA. For example, even if a solid immersion lens (effective NA=1.2) is used with a blue light source ($\lambda$=413 nm), the spot diameter Ws is about 0.34 $\mu$m. There may be a case where, with the track pitch narrowed, minute marks are recorded at a pitch of 0.09 or less $\mu$m, which is about a quarter of the spot diameter Ws, in the direction along the code tracks. If a signal is reproduced from any one of the recorded marks on any one of the code tracks with a light spot having a diameter of 0.34 $\mu$m, the signal or signals from one or more of the preceding and succeeding marks on this track leak into that signal, which can therefore not be distinguished.

Even if a current magnetic disk apparatus forms minute information marks at a pitch of about 0.07 $\mu$m on a magnetic disk, it is possible to reproduce signals having sufficient amplitude from the marks, because the apparatus includes a reproducing magnetic head which is high in space resolution. Thus, in an optical disk apparatus fitted with a laser which is specific in wavelength and a converging lens, the spot diameter, on which the space resolution for reproduction depends, is considerably larger than a minute information mark. Therefore, this optical disk apparatus is low in reproducing resolution. This is a bar to the densification of optical disks.

A method proposed for solving this problem is the magneto-optical fusional system described in "Proceedings of Magneto-Optical Recording International Symposium '99", pp. 225–228. This system employs a magneto-optical recording medium as an optical recording medium. As is the case with conventional optical disk apparatuses, the recordation of information on a magneto-optical recording medium involves scanning the recording medium with a laser beam radiated by an optical head and a magnetic field applied by a magnetic head. This forms, on a code track of the recording medium, an information mark represented by one of the directions of magnetization which are perpendicular to the surfaces of the recording medium.

Information can be reproduced from the magneto-optical recording medium by a reproducing means which is similar to conventional magnetic disk apparatuses. The reproducing means includes a magnetic head on which a magneto-resistance element is mounted. The information recorded on the recording medium can be reproduced by the magnetic head detecting the magnetic leakage field leaking from the information mark recorded on the recording medium. The magneto-resistance element has a width of some tens of nanometers in the directions along the code tracks of the recording medium. This width is small in comparison with the foregoing light spot diameter, which is hundreds of nanometers. Therefore, the reproduction with the magneto-resistance element can improve the reproducing resolution in the directions along the tracks. It is also possible to improve the reproducing resolution in the directions across the code tracks by narrowing the magneto-resistance element in these directions. Thus, the magneto-optical fusional system solves the problem of information leakage with the conventional optical disk apparatuses by detecting information during reproduction with the magnetic head on which the magneto-resistance element is mounted. This allows the narrowed track pitch and mark pitch to make the recording density higher.

The magneto-optical fusional system causes the magnetic heads to track or follow the code tracks by a method disclosed in Japanese Patent Application Laid-Open No. 2-218016. This method includes forming predetermined regions of a magneto-optical recording medium with pits which have a magnetically readable structure, causing a magnetic head to detect, as tracking signals, the magnetic leakage fields leaking from the ends of the pits, and controlling the position of the magnetic head on the basis of the detected tracking signals. In order for an optical head to track a code track, the position of the optical head is controlled by the sample servo tracking system employing the pits and used with the conventional optical disk apparatuses.

As stated above, a magneto-optical recording medium used with the magneto-optical fusional system has pits formed in its predetermined regions so that a magnetic head and an optical head can track the code tracks of the recording medium. However, while the floating slider on which the magnetic and optical heads are mounted is scanning over the regions where the pits are formed, the slider may contact the recording medium and cause a head crash. The preset floating height of the slider of each conventional recording and reproducing apparatus on this system is large enough to cause no head crash even if the floating height lowers over the regions of a magneto-optical recording medium which are formed with pits.

The magnetic leakage fields leaking from information marks micrified for higher density are smaller than those leaking from information marks recorded at lower density. Therefore, in order to reproduce densely recorded information from a recording medium, it is demanded that the floating height of the slider of a recording and reproducing apparatus be as small as possible so that the small magnetic leakage fields leaking from minute information marks on the medium can be detected reliably or securely. As stated above, however, if the preset floating height of the slider of a recording and reproducing apparatus on the magneto-optical fusional system is small, head crashes are liable to occur in the regions of a recording medium which are formed with pits. It is consequently difficult to reliably reproduce the densely recorded minute marks. If a magneto-optical recording medium is formed with recessed or pitted and embossed patterns in and on a surface thereof, dust etc. may collect in the recesses of the patterns and be another main cause of head crashes.

SUMMARY OF THE INVENTION

In view of the foregoing problems with the prior art, it is an object of the present invention to provide an information recording medium suitable for the magneto-optical fusional system from which it is possible to reproduce information reliably without causing a head crash even if the floating height of a head of a recording and reproducing apparatus is low for reproduction of a minute mark, from which a weak magnetic field leaks.

It is another object of the present invention to provide a novel recording and reproducing apparatus and a novel head positioning method which enable an optical head, a recording magnetic head and a reproducing magnetic head to be positioned reliably at target tracks of a recording medium.

In accordance with a first aspect of the present invention, an information recording medium is provided, on which information can be recorded with light and an external magnetic field applied to the recording medium. The information recording medium includes a substrate and a magnetic layer formed on the substrate. The magnetic layer includes a data region and a positioning region. The positioning region has management information for managing the data region and a servo pattern. The management information and the servo pattern are formed as magnetic marks.

Figure 5:
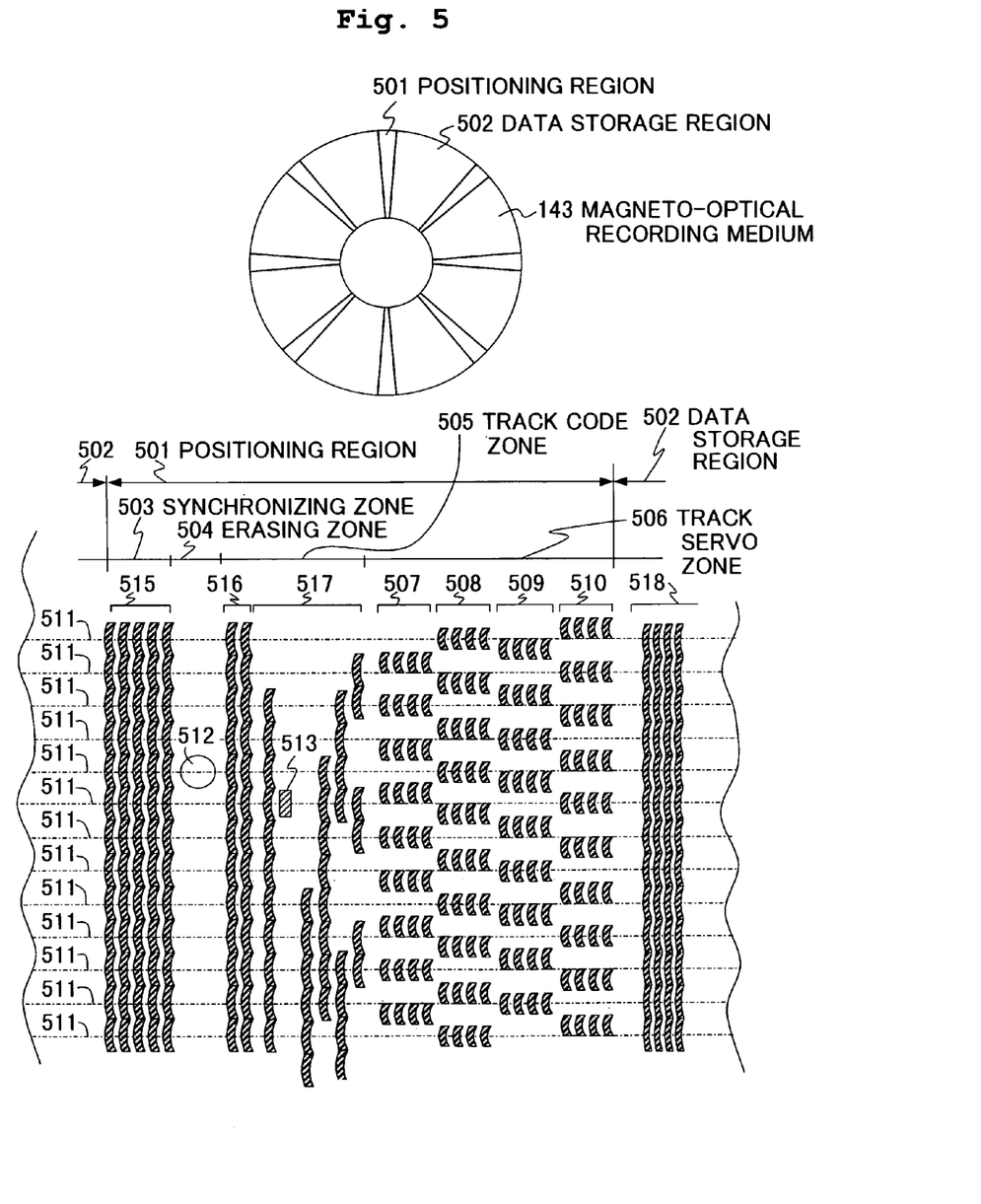
FIG. 5 is a plan view of the information recording medium according to the present invention and a diagram of magnetic mark patterns formed in a positioning region of the recording medium.

The magnetic layer has management information for managing the data region and a track servo pattern which is necessary when the data region is tracked. The management information and the servo pattern are formed as magnetic marks in the magnetic layer. The information recording medium may, as shown in FIG. 5, include a data storage region 502 for recording information and a positioning region 501 for positioning optical and magnetic heads. The positioning region 501 may include a synchronizing zone 503, an erasing zone 504, a track code zone 505, and a track servo zone 506. Magnetic marks are formed in these zones and referred to as a group of management information marks because the marks are read out for the management of the data region. The management information marks can be recorded as desired patterns with a servo writer for use in or with a magnetic disk apparatus.

The information recording medium may take the form of a disk. The disk does not have recessed and embossed patterns formed in it, as is the case with the conventional magneto-optical fusional system. This enables a slider on which a recording head and a reproducing head are mounted to float stably over the whole disk. Therefore, it is not necessary to set a large floating margin for the slider in order to prevent head crashes. In other words, it is possible to reduce the floating height of the recording and reproducing heads from the recording medium. This makes it possible to form minuter information marks, from which weaker magnetic fields leak, for higher recording density.

In accordance with a second aspect of the present invention, a recording and reproducing apparatus is provided for recording information on and reproducing information from an information recording medium, which includes a substrate and a magnetic layer provided on the substrate. The magnetic layer has a servo pattern and management information recorded thereon as magnetic marks. The recording and reproducing apparatus includes:

an optical head for irradiating the information recording medium with light during information recordation;

a recording magnetic head for applying a recording magnetic field to the information recording medium;

a reproducing magnetic head for detecting magnetic leakage fields from the magnetic marks on the magnetic layer during information reproduction;

a first positioner for positioning the optical head and the recording magnetic head at a target track of the information recording medium on the basis of magneto-optical signals from the magnetic marks; and a second positioner for positioning the reproducing magnetic head at the target track during information reproduction, with the reproducing magnetic head detecting the magnetic leakage fields from the magnetic marks.

This recording and reproducing apparatus can be used with an information recording medium in which servo patterns, management information, etc. are formed in advance as magnetic marks. It is possible to record information as a magnetic mark by radiating light to a target track position on the recording medium by means of the optical head, and simultaneously applying an external magnetic field by means of the recording magnetic head to the area being irradiated with the light. It is possible to reproduce the recorded information by detecting the magnetic leakage field from the magnetic mark by means of the reproducing magnetic head, which may include a magneto-resistance element.

During information recordation, it is possible to position the optical head and the recording magnetic head at a target track of the information recording medium by radiating a laser beam to the magnetic marks as the servo patterns, the management information, etc. by means of the optical head, and detecting the magneto-optical signals from the magnetic marks. The first positioner generates a servo error signal and management information on the basis of the detected signals, and controls the positions of the optical head and the recording magnetic head on the basis of the servo error signal and the management information.

The first positioner may include:
  a photodetector for detecting the polarized components of the light reflected by the magnetic marks, and outputting detected magneto-optical signals;
  a first control signal generator for obtaining track position information about the optical head and the recording magnetic head from the signals detected from the magnetic marks detected by the photodetector, and generating control signals for positioning the heads at a target track position; and
  a first actuator for moving the optical head and the recording magnetic head to the target track position in accordance with the control signals.

During information reproduction, it is possible to position the reproducing magnetic head at a target track position by detecting the magnetic leakage fields leaking from the magnetic marks as the servo patterns, the management information, etc. by means of the magnetic head. The second positioner generates a servo error signal and a management information signal on the basis of the signals detected by the magnetic head, and controls the position of the magnetic head on the basis of the servo error signal and the management information signal.

The second positioner may include:
  a second control signal generator for obtaining the current track position information about the reproducing magnetic head from the signals detected from the magnetic marks detected by this head, and generating a control signal for positioning the reproducing magnetic head at a target track position; and
  a second actuator for moving the reproducing magnetic head to the target track position in accordance with the control signal from the second control signal generator.

If the optical head, the recording magnetic head and the reproducing magnetic head are mounted on or in the same slider, the first actuator may be substituted for the second actuator.

A conventional optical disk apparatus is used with an optical recording medium a surface of which is pitted or recessed and embossed as servo patterns, management information, etc. when the medium was made. For information recordation or reproduction, the optical head of this optical disk apparatus irradiates the surface with a laser beam and detects the light refracted by the recesses and embossments. From the result of the detection, the optical disk apparatus detects the position of the optical head over the optical recording medium and the amount of deviation of the optical head from a target code track of the medium for the tracking and seek operation of the optical head. A recording and reproducing apparatus on the magneto-optical fusional system, too, follows the structure of the optical disk apparatus in such a manner that the tracking and seek operation of the optical and magnetic heads are based on the light refracted by recessed and embossed patterns. The recording and reproducing apparatus according to the present invention differs greatly from the conventional optical disk apparatus in magneto-optically reproducing the servo patterns and management information recorded as magnetic marks on an information recording medium, and performing the tracking and seek operation of the optical head on the basis of the reproduced magneto-optical signals.

A conventional magnetic disk apparatus is used with a magnetic recording medium formed with no pitted information, which consists generally of recessed and embossed patterns. Before information is recorded on or reproduced from the magnetic recording medium, a servo writer forms servo patterns, management information, etc. as directions of magnetization in the recording medium. During information recordation or reproduction, the magnetic recording apparatus detects the magnetic leakage fields from the servo patterns and management information by means of its reproducing magnetic head, which may include a magneto-resistance element, and detecting the position of the magnetic head over the recording medium and the amount of deviation of the magnetic head from a target code track of the recording medium on the basis of the detected signals, for the tracking and seek operation of the magnetic head. During information reproduction, similarly to the conventional magnetic disk apparatus, the recording and reproducing apparatus according to the present invention controls the position of its reproducing magnetic head on the basis of the magnetic marks representing the servo patterns and management information. During information recordation, however, this recording and reproducing apparatus differs greatly from the magnetic disk apparatus in controlling its recording magnetic head on the basis of the magneto-optical signals from magnetic marks. The recording and reproducing apparatus also differs greatly from the magnetic disk apparatus in that the former includes an optical system for detecting the magneto-optical signals from magnetic marks and an optical system for heating an information recording medium during information recordation.

The foregoing structure of the recording and reproducing apparatus according to the present invention makes it possible to realize a magneto-optical fusional system for use with a flat disk. This improved magneto-optical fusional system enables a recording or reproducing head to float closer over the disk without crashing against it. Therefore, tracking, seek operation and information reproduction are possible at high sensitivity even with magnetic marks which are minute for high density.

In the recording and reproducing apparatus according to the present invention, the reproducing magnetic head for detecting the magnetic leakage fields from magnetic marks to reproduce information may be an MR head or a GMR head. These heads can reliably detect the magnetic leakage fields from minute magnetic marks, and are therefore suitable as magnetic heads for reproducing information recorded densely on information recording media.

In accordance with a third aspect of the present invention, a method is provided for positioning an optical head, a recording magnetic head and a reproducing magnetic head at a predetermined track of an information recording medium. The recording medium includes a substrate and a magnetic layer provided on the substrate. The magnetic layer has magnetic marks recorded thereon which represent a servo pattern and management information. This method includes:
  irradiating the information recording medium with a laser beam to detect magneto-optical signals from the magnetic marks, and controlling the positions of the optical head and the recording magnetic head on the basis of the detected magneto-optical signals, during information recordation; and detecting magnetic leakage fields from the magnetic marks with the reproducing magnetic head, and controlling the position of the reproducing magnetic head on the basis of the detected magnetic leakage fields, during information reproduction.

Figure 3:
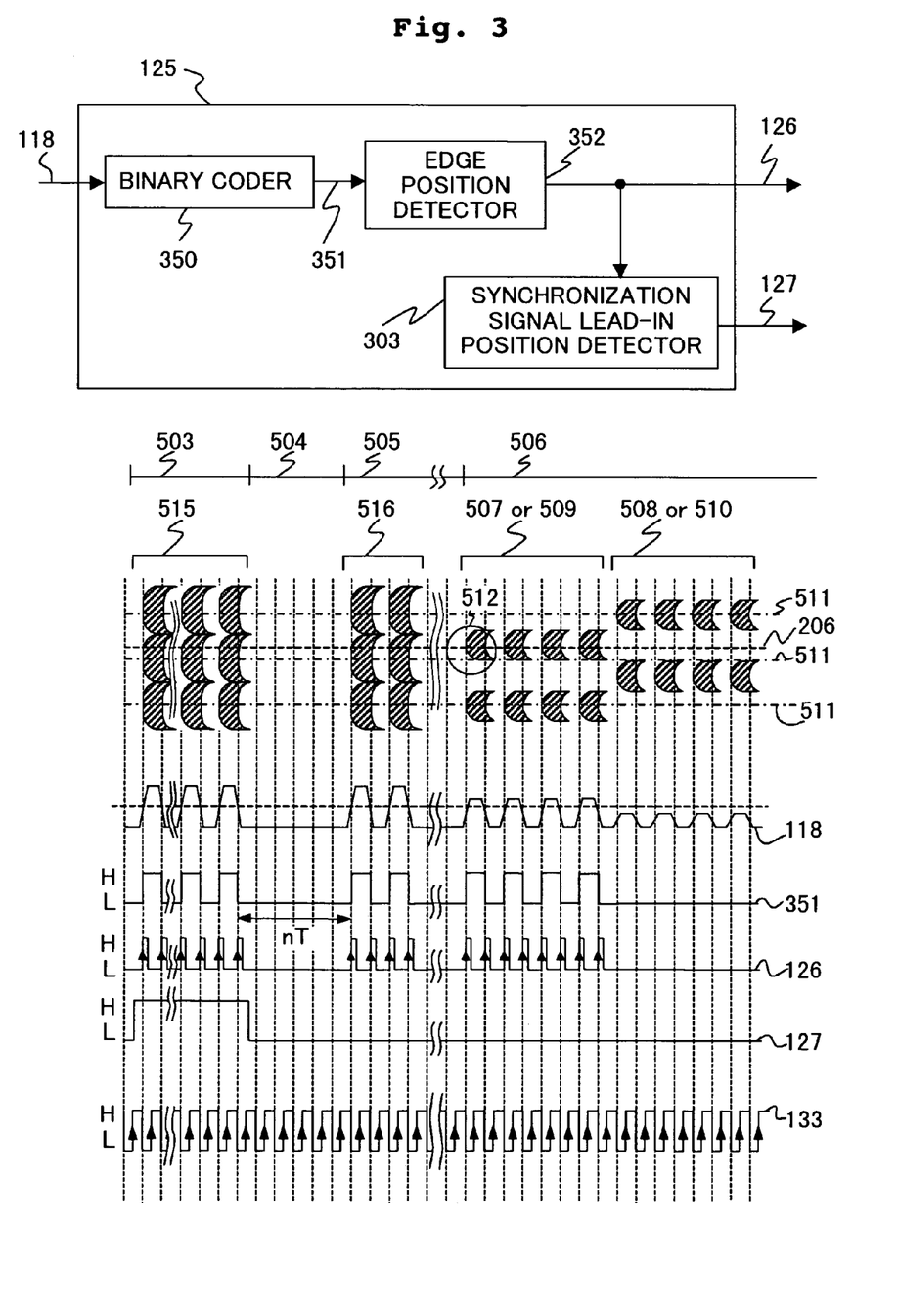
FIG. 3 is a diagram of a recording synchronous pulse generator, an illustrative diagram of groups of management information marks formed in an information recording medium, and a diagram of the signals reproduced from the mark groups with an optical head.

During information recordation, as shown in FIG. 3, in order for a light spot 512 to track on a code track 511, the head positioning method according to the present invention includes scanning with the light spot 512 the servo patterns 507 to 510 recorded as magnetic marks in a track servo zone 506 and the track codes 517 recorded as magnetic marks in a track code zone 505, and simultaneously detecting the magneto-optical signals from the magnetic marks. On the basis of the detected magneto-optical signals, the position of the optical head, where the light spot 512 is formed, is controlled.

Figure 2:
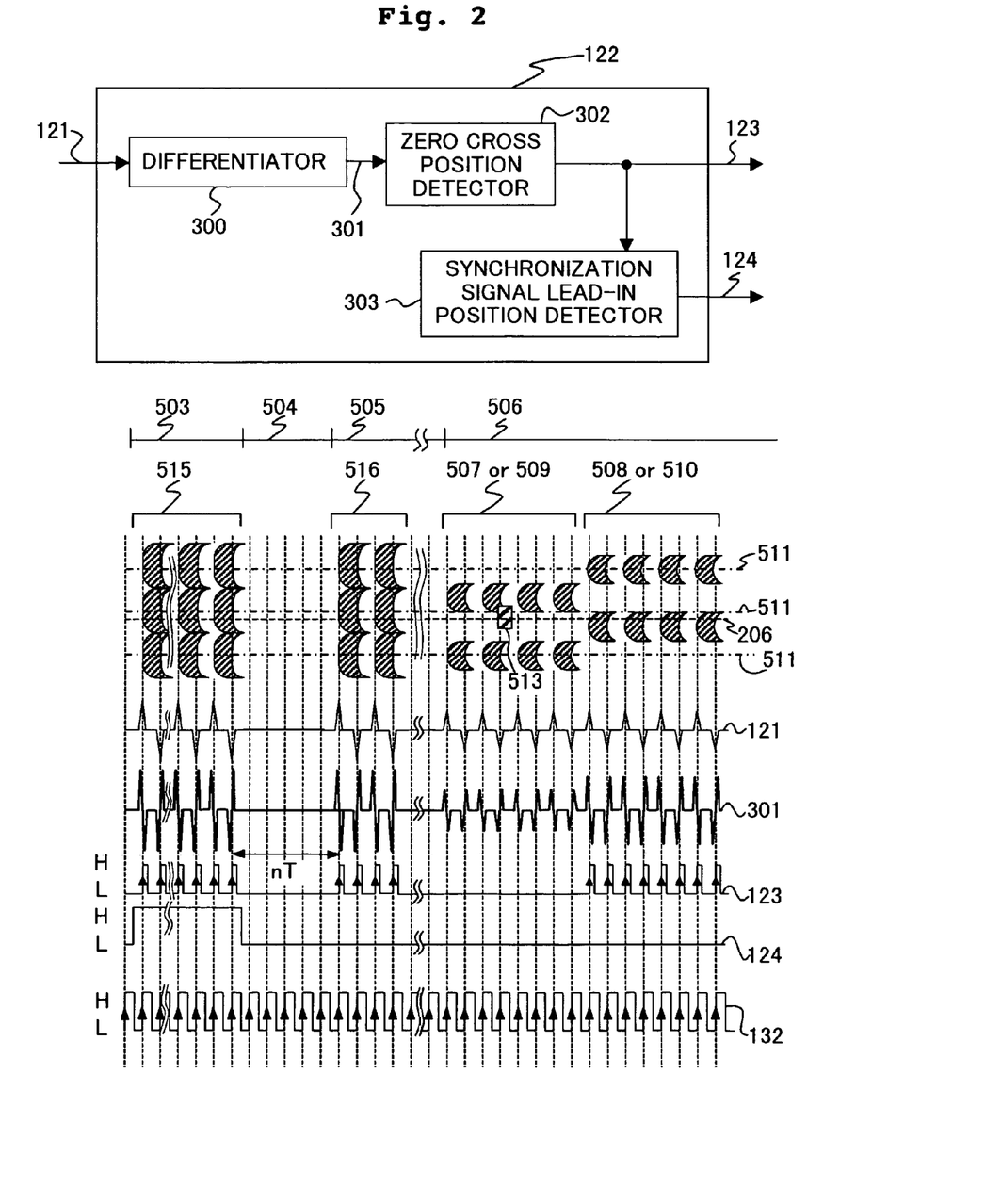
FIG. 2 is a diagram of a reproducing synchronous pulse generator, an illustrative diagram of groups of management information marks formed in an information recording medium, and a diagram of the signals reproduced from the mark groups with a magnetic head.

During information reproduction, as shown in FIG. 2, in order for the reproducing magnetic head (MR head) 513 to track on a code track 511, the head positioning method according to the present invention includes controlling the position of the reproducing magnetic head 513 by detecting with this head the magnetic leakage fields leaking from the servo patterns 507 to 510 recorded as magnetic marks in a track servo zone 506 and the track codes 517 recorded as magnetic marks in a track code zone 505.

Thus, on the basis of the magnetic marks formed in advance in an information recording medium including a flat substrate, it is possible to control the positions of the optical head and the recording and reproducing magnetic heads. Therefore, in a magneto-optical fusional system employing an information recording medium according to the first aspect of the present invention, it is possible to position the optical and magnetic heads reliably at target tracks of the recording medium without causing the heads to crash against the medium.

The optical head, the recording magnetic head and the reproducing magnetic head may be positioned on the same side of the information recording medium. Alternatively, the optical head may be positioned on one side of the recording medium while the magnetic heads may be positioned on the other side.

When the optical head irradiates the information recording medium with light, a light spot is formed on the recording medium. The recording and reproducing magnetic heads may include a magnetic field generator and a magnetic field detector, respectively. The light spot may be larger than the magnetic field generator and the magnetic field detector. In this case, the magnetic marks formed in the recording medium may be rectangular.

DETAILED DESCRIPTION OF THE PREFERRED EMBODIMENTS

The present invention is embodied by an information recording medium and different types of recording and reproducing apparatus which will be described below in detail with reference to the drawings. The invention is not limited to the embodiments. In the description of the embodiments, identical and similar components are assigned the same reference numerals.

Figure 1:
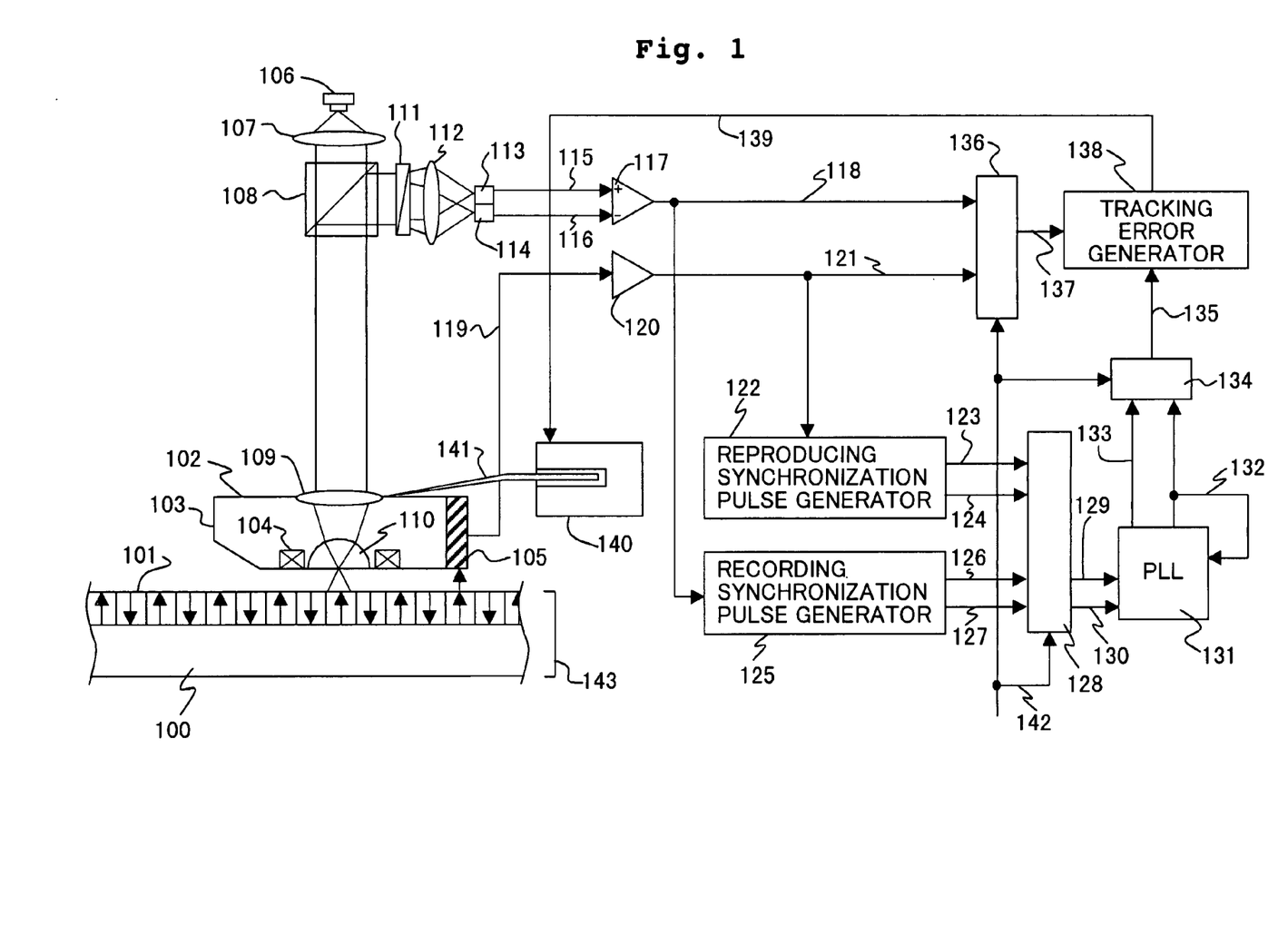
FIG. 1 is a schematic diagram of a recording and reproducing apparatus according to the present invention.

FIG. 1 schematically shows a recording and reproducing apparatuses embodying the present invention. The recording and reproducing apparatus includes a recording and reproducing head 102, which will be described first.

[Recording and Reproducing Head]

The recording and reproducing head 102 includes an optical system, which includes a converging lens 109 for use during recordation and a solid immersion lens (SIL) 110. The recording and reproducing head 102 also includes a coil 104 for applying a magnetic field during recordation and a reproducing magnetic head 105. These components or parts are mounted on or in a slider 103, which is fitted to the front end of a swing arm 141. A magneto-optical recording medium 143 takes the form of a disk and can be rotated by an electric motor (not shown). Details of the recording medium 143 will be described later. When the recording medium 143 rotates, air flows into the space between the medium 143 and slider 103. The air flow floats the slider 103 over the recording medium 143. The swing arm 141 urges the slider 103 down toward the recording medium 143. By balancing the floating force and the urging force with each other, it is possible to float the slider 103 at a constant height from the recording medium 143. In this embodiment, the floating height is set at 30 nm.

A semi-conductor laser 106 is used as a laser light source for emitting a polarized divergent laser beam having a wavelength λ of 660 nm. The divergent laser beam is converted into a parallel beam by a collimator lens 107. The parallel beam is incident through a beam splitter 108 on the converging lens 109. The laser beam converged by the converging lens 109 is incident on the solid immersion lens 110 and condensed on its bottom. The converging lens 109 has a numerical aperture NA of 0.6. The solid immersion lens 110 is a hemispherical lens made of glass having a refractivity of 1.8, and has an effective numerical aperture of about 1.1. The condensed beam forms a light spot on the bottom of the solid immersion lens 110. The diameter of the light spot is restricted by (λ/effective NA) to about 0.6 μm. If the floating height of the slider 103 from the magneto-optical recording medium 143 is about 1/10 or less of the light source wavelength λ, the laser beam condensed on the bottom of the solid immersion lens 110 exudes as evanescent light onto the recording medium 143. The evanescent light forms, on the recording film 101 of the recording medium 143, a light spot 512 having a diameter nearly equal to the foregoing one. Specifically, because the light source wavelength λ is 660 nm, and the floating height is 30 nm, which is 1/10 or less of this wavelength λ, the light spot 512 which is about 0.6 μm in diameter is formed on the recording film 101, satisfying the foregoing condition.

[Magneto-Optical Recording Medium and Recordation of Management Information]

Figure 6:
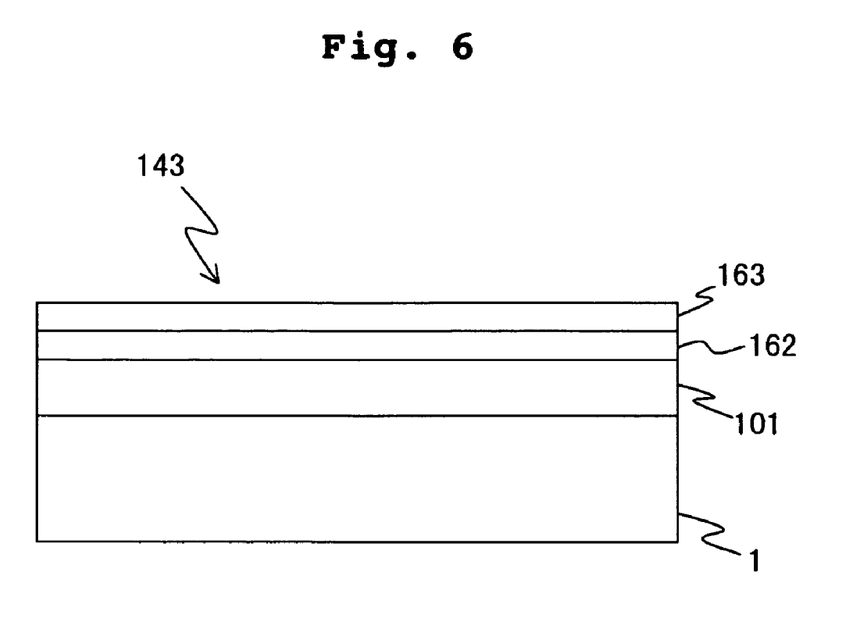
FIG. 6 is a schematic section of the information recording medium according to the present invention.

As shown in FIG. 6, the magneto-optical recording medium 143 includes a recording film 101, a protective film 162 and a lubricative layer 163 which are layered in order over a flat substrate 100. The recording film 101 is a layer where information can be recorded as directions of magnetization. The recording film 101 may be made of TbFeCo or another magnetic material which is perpendicularly magnetized as is the case with the recording layers of conventional magneto-optical recording media. The recording film 101 may be either an in-plane magnetic film or a perpendicular magnetic film. The protective layer 162 protects the recording layer 101 from wear or abrasion and corrosion or erosion, and may be made of SiN. The lubricative layer 163 keeps the recording and reproducing head 102 durable for running or travelling on the recording medium 143, and may be made of perfluoropolyether.

FIG. 5 includes a schematic plane view of the magneto-optical recording medium 143 as viewed on its side where the recording layer 101 lies. The recording medium 143 is formed with positioning regions 501 and data storage regions (data recording regions) 502. Before recordation or reproduction, information on the management of the storage regions 502 and information on the control of the position of the light spot 512 and/or the position of the magnetic head 513 are recorded in the positioning regions 501. Specifically, each positioning region 501 includes a synchronizing zone 503, a track code zone 505 and a track servo zone 506. Before information is recorded or reproduced, synchronizing patterns 515 are recorded in the synchronizing zones 503, and track code starting patterns 516 and track codes 517 are recorded in the code zones 505, while servo patterns 507–510 are written in the servo zones 506. These patterns are recorded on the light pulse and magnetic field modulation system used with conventional optical disk apparatus, with the head position controlled precisely by a servo writer used conventionally with (or in) magnetic disk apparatus. A lower part of FIG. 5 is a general view of one of the positioning regions 501, where information has been written.

In order that the patterns written in the synchronizing zones 503 and the track code zones 505 can be detected with the light spot 512 and/or the magnetic head 513 in any positions, the width (in the directions across the code tracks 511 of the magneto-optical recording medium 143) of each of these patterns is so adjusted as to nearly equal the pitch of the code tracks 511. The width of each of the servo patterns 507–510 written in the track servo zones 506 is so adjusted as to be smaller than the track pitch, because the width (in the directions across the code tracks 511) of the magneto-resistance effect element of the magnetic head 513 is smaller than the track pitch. If each of the servo patterns 507–510 is nearly equal in width to or narrower than the magnetic head 513, there can be no dead zone when the magnetic head 513 generates a track error signal. The relationship between the width of each of the servo patterns 507–510 and the width of the magnetic head 513 is similar to that of the conventional magnetic disk apparatus. Because the width of the magnetic head 513 is 0.4 μm, the width of each of the servo patterns 507–510, too, is so adjusted as to be roughly 0.4 μm. However, the laser power is so set as to be smaller when the servo patterns 507–510 are recorded than when the other patterns are recorded in the positioning regions 501, and the laser power is so controlled that each of the servo patterns 507–510 is nearly equal in width to the magnetic head 513.

[Optical Head Positioner]

A description will be given below of a device (first positioner) for causing the, light spot 512 to track or follow the code tracks 511 in accordance with the patterns recorded in the positioning regions 501 by the foregoing method and apparatus.

The conventional optical disk apparatus for recordation on and reproduction from a magneto-optical recording medium reproduces information by utilizing the phenomenon that the plane of polarization of the light beam reflected by a recorded mark rotates by an angleθk relative to the plane of polarization of the associated incident beam, and the phenomenon that the plane of polarization of the light beam reflected by an area other than a recorded mark rotates by −θk relative to the plane of polarization of the associated incident beam. The angle of rotationθk is referred to as the Kerr angle of rotation, which is a magneto-optical effect. Similarly to a conventional manner, as shown in FIG. 1, an optical system for detecting the rotation of a plane of polarization consists of a Wollaston prism 111, a condensing or collective lens 112, and photodetectors 113 and 114. The detectors 113 and 114 make photoelectric conversions to output magneto-optical signals 115 and 116, respectively. A subtracter 117 generates a magneto-optical signal 118 which is the difference between the magneto-optical signals 115 and 116. Because the magneto-optical signal 118 changes in amplitude with the angle of rotationθk or −θk, the conventional optical disk apparatus uses this signal 118 to reproduce recorded information.

The recording and reproducing apparatus according to this embodiment generates a tracking error signal from a magneto-optical signal 118. As shown in FIG. 5, the light spot 512 tracks one of the code tracks 511 on the basis of the tracking error signal. In order to precisely generate tracking error signals of the head, it is necessary to accurately detect the patterns recorded in the positioning regions 501 shown in FIG. 5. The magneto-optical recording medium 143 is rotated at a substantially constant speed by the motor (not shown), but the speed fluctuates slightly with time because the motor has wow and flutter. Therefore, in order to accurately detect the patterns recorded in the positioning regions 501, it is necessary to generate synchronizing signals 133 synchronous with the rotation of the recording medium 143, and detect the patterns on the basis of the synchronizing signals 133. The generation of the synchronizing signals 133 involves detecting the edge positions of patterns recorded in the positioning regions 501, then generating target signals synchronous with the rotation of the recording medium 143, and synchronizing the synchronizing signals 133 with the target signals.

With reference to FIG. 1, a recording synchronous pulse generator 125 is a circuit for generating such target signals.

As shown in detail in FIG. 3, the pulse generator 125 consists of a binary coder 350, an edge position detector 352 and a synchronizing signal lead-in position detector 303. The illustrative diagram of information marks in FIG. 3 shows part of the synchronizing patterns 515, the track code starting patterns 516 and the servo patters 507–510 shown in FIG. 5. The signal waveforms shown in a lower portion of FIG. 3 are a timing chart of the signals generated by the pulse generator 125 while the light spot 512 is moving on its tracking locus 208. First, the magneto-optical signal 118, which changes in amplitude with the angle of rotation θk or −θk of a plane of polarization, is converted into a binary coded signal 351 by the binary coder 350 at the slice level indicated by a broken line. On the basis of the binary coded signal 351, the edge position detector 352 outputs recording synchronous pulses 126. The leading edges of the synchronous pulses 126 coincide substantially with the leading or trailing edge positions of the binary coded signal 351. On the basis of the synchronous pulses 126, a synchronizing signal 133 is generated. The widths of the synchronizing patterns 515 and the track code starting patterns 516 are nearly equal to the track pitch. Therefore, whether the tracking locus 206 of the light spot 512 coincides with a code track 511 or not, the leading edges of the synchronous pulses 126 appear at the edges of the synchronizing patterns 515 and the starting patterns 516. The synchronizing signal lead-in position detector 303 always observes or monitors the intervals between the trains of recording synchronous pulses 126. If any one of these pulse intervals is roughly nT, the lead-in position detector 303 judges or decides that the light spot 512 has passed through an erasing zone 504. Then, this position detector 303 outputs a recording synchronization lead-in gate signal 127 which is high in level only while the light spot 512 is present in the next synchronizing zone 503 when the magneto-optical recording medium 143 has turned further. The recording format of the recording medium 143 is preset, however, in such a manner that each of the pulse intervals which are roughly nT appears only between one train of synchronizing patterns 515 and the succeeding train of track code starting patterns 516.

With reference to FIG. 1, during information recordation, a host controller (not shown) outputs recording/reproducing gate signals 142 at a high level. In the meantime, a multiplexer 128 outputs recording synchronous pulses 126 as synchronous pulses 129, and also outputs recording synchronization lead-in gate signals 127 as synchronization lead-in gate signals 130.

A conventional synchronizing signal generator (PLL circuit) 131 generates synchronizing signals 133. Only while the synchronization lead-in gate signals 130 are high in level, that is to say, only while the light spot 512 is present in the synchronizing zones 503 in FIG. 3, the signal generator 131 applies feedback so that the leading edges of synchronizing signals 132 coincide with those of the synchronous pulses 129. This synchronizes the synchronizing signals 132 with the rotation of the magneto-optical recording medium 143. The synchronizing signals 133 output from the signal generator 131 are generated by reversal in level (high or low) of the synchronizing signals 132. The synchronizing signals 133, too, are synchronous with the rotation of the recording medium 143. As shown in FIG. 3, the leading edges of the synchronizing signals 133 coincide substantially with the peak positions of the magneto-optical signals 118.

With reference to FIG. 1, when the recording/reproducing gate signals 142 are high in level, that is to say, during information recordation, a multiplexer 134 outputs the synchronizing signals 133 as sample clock pulses 135. When the gate signals 142 are high in level, a multiplexer 136 outputs the magneto-optical signals 118 as reproduced signals 137.

A tracking error signal generator 138 generates tracking error signals 139 on the basis of the reproduced signals 137 and the sample clock pulses 135, that is to say, on the basis of the magneto-optical signals 118 and the synchronizing signals 133. This signal generator 138 may be similar to a conventional tracking error signal generating circuit. The principle of generation of the tracking error signals will be explained briefly below.

As shown in FIG. 3, the leading edges of the synchronizing signals 133 coincide substantially with the peak positions of the magneto-optical signals 118. Accordingly, the tracking error signal generator 138 samples the reproduced signals 137 in order at the leading edges of the sample clock pulses 135, and calculates the values of peak amplitude of the signals reproduced from the servo patterns 507 and 508 or the servo patterns 509 and 510. Once the values of peak amplitude are found, a tracking error signal 139 is calculated as the finite difference in peak amplitude between servo patterns 507 and 508 or between servo patterns 509 and 510.

Figure 4:
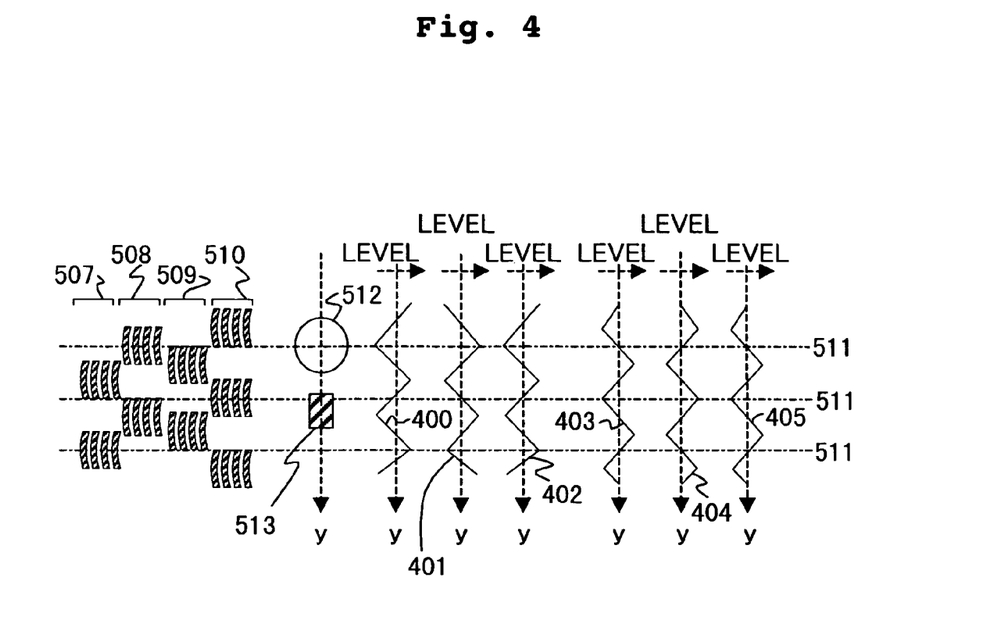
FIG. 4 is a diagram for description of the generation of a tracking error signal with an optical head and a magnetic head.

FIG. 4 is an illustrative diagram of thus found tracking error signals. When the light spot 512 moves along the y-axis across the code tracks 511, the values of peak amplitude of the reproduced signals 137 of servo patterns 507 change as represented by a peak amplitude waveform 400. Likewise, the values of peak amplitude of the reproduced signals 137 of servo patterns 508, 509 and 510 change as represented by peak amplitude waveforms 401, 403 and 404, respectively. In the meantime, the tracking error signal 139 is represented by a tracking error waveform 402 (the level of which is scaled arbitrarily) as the finite difference between the peak amplitude waveforms 400 and 401, or by a tracking error waveform 405 (the level of which is scaled arbitrarily) as the finite difference between the peak amplitude waveforms 403 and 404. The tracking error signal generator 138 decides which of the error waveforms 402 and 405 will be adopted as the error signal 139. For example, on the basis of the results of detection of the track codes 517 in front of the track servo zone 506, the error waveform 402 is adopted for every other code track including the second track (even number), while the error waveform 405 is adopted for every other code track including the first track (odd number).

With reference to FIG. 1, once a tracking error signal 139 is generated by the above means, an actuator 140 so controls the position of the recording/reproducing head 102, which is fitted to the front end of the swing arm 141, as to make the error signal 139 smaller in a conventional manner.

[Magnetic Head Positioner]

A description will be given below of a device (second positioner) for causing the magnetic head 105 to track the code tracks 511 in accordance with the patterns recorded in the positioning regions 501. In order for the magnetic head 105 to track the code tracks 511, this head 105 reproduces the patterns recorded in the positioning regions 501. On the basis of the magnetic reproduced signals 119 obtained as a result of the reproduction, the position of the magnetic head 105 is controlled. A preamp 120 amplifies the reproduced signals 119 to such a degree that they are nearly equal in amplitude to the magneto-optical signals 118. The preamp 120 outputs amplified magnetic reproduced signals 121. Similarly to the position control of the light spot 512, a reproducing synchronous pulse generator 122 generates target signals with which the synchronizing signals 132 output from the PLL circuit 131 on the basis of the amplified magnetic reproduced signals 121 can be synchronous with the rotation of the magneto-optical recording medium. The signal waveforms obtained if the patterns recorded in the positioning regions 501 are reproduced with the light spot 512 differ from those obtained if these patterns are reproduced by the magnetic head 105. Therefore, in order to generate target signals corresponding to the edges of the patterns, individual or separate synchronous pulse generators are needed.

FIG. 2 is a detailed diagram of the reproducing synchronous pulse generator 122, which includes a differentiator 300, a zero cross position detector 302 and a synchronizing signal lead-in position detector 303. The illustrative diagram of information marks in FIG. 2 shows part of the synchronizing patterns 515, the track code starting patterns 516 and the servo patters 507–510 shown in FIG. 5. The signal waveforms shown under the illustrative diagram are a timing chart of the signals generated by the pulse generator 122 while the magnetic head 513 is moving along a tracking locus 206. As shown in FIG. 2, the amplified magnetic reproduced signals 121 have waveforms pulsed at the edges of the patterns. Therefore, the differentiator 300 differentiates the reproduced signals 121 and generates differentiated signals 301 which cross the zero level at the pattern edges. The zero cross position detector 302 extracts the zero positions of the differentiated signals 301 and generates reproducing synchronous pulses 123, the leading edges of which coincide substantially with the zero cross positions of the differentiated signals 301. Whether the tracking locus 208 of the magnetic head 513 coincides with a code track 511 or not, the leading edges of the synchronous pulses 123 appear at the edges of the synchronizing patterns 515 and the track code starting patterns 516. The synchronizing signal lead-in position detector 303 is entirely identical with that of the recording synchronous pulse generator 125, and likewise outputs reproducing synchronization lead-in gate signals 124 which are high in level only while the magnetic head 513 is positioned in the synchronizing zones 503.

During information reproduction, the host controller (not shown) outputs recording/reproducing gate signals 142 (FIG. 1) at a low level. In the meantime, the multiplexer 128 outputs reproducing synchronous pulses 123 as synchronous pulses 129, and outputs reproducing synchronization lead-in gate signals 124 as synchronization lead-in gate signals 130.

As shown earlier, only while the synchronization lead-in gate signals 130 are high in level, that is to say, only while the magnetic head 513 is positioned in the synchronizing zones 503, the PLL circuit 131 applies feedback so that the leading edges of the synchronizing signals 132 coincide with those of the synchronous pulses 129. This synchronizes the synchronizing signals 132 with the rotation of the magneto-optical recording medium 143.

When the recording/reproducing gate signals 142 are low in level, that is to say, during information reproduction, the multiplexer 134 outputs synchronizing signals 132 as sample clock pulses 135. When the gate signals 142 are low in level, the multiplexer 136 outputs amplified magnetic reproduced signals 121 as reproduced signals 137.

The tracking error signal generator 138 operates entirely in the same manner as during recordation. As shown in FIG. 4, even when the magnetic head 513 moves along the y-axis across the code tracks 511, the tracking error signals 139 are nearly equal to the tracking error waveform/s 402 and/or 405 obtained when the light spot 512 moves along the y-axis.

Once a tracking error signal 139 is generated by the above means, the actuator 140 so controls the position of the recording/reproducing head 102, which is fitted to the front end of the swing arm 141, as to make the error signal 139 smaller in a conventional manner. This positions the magnetic head 513.

The first control signal generator of the present invention consists mainly of the recording synchronous pulse generator, the multiplexers, the PLL circuit and the tracking error signal generator. The second control signal generator of the invention consists mainly of the reproducing synchronous pulse generator, the multiplexers, the PLL circuit and the tracking error signal generator.

The information recording medium and the recording and reproducing apparatus according to the present invention have been described hereinbefore, but the invention is not limited to them. For example, the information recording medium according to the embodiment includes a magnetic layer which is a perpendicular magnetic film, but the invention may also be applied to an information recording medium including a magnetic layer which is an in-plane magnetic film.

Figure 7:
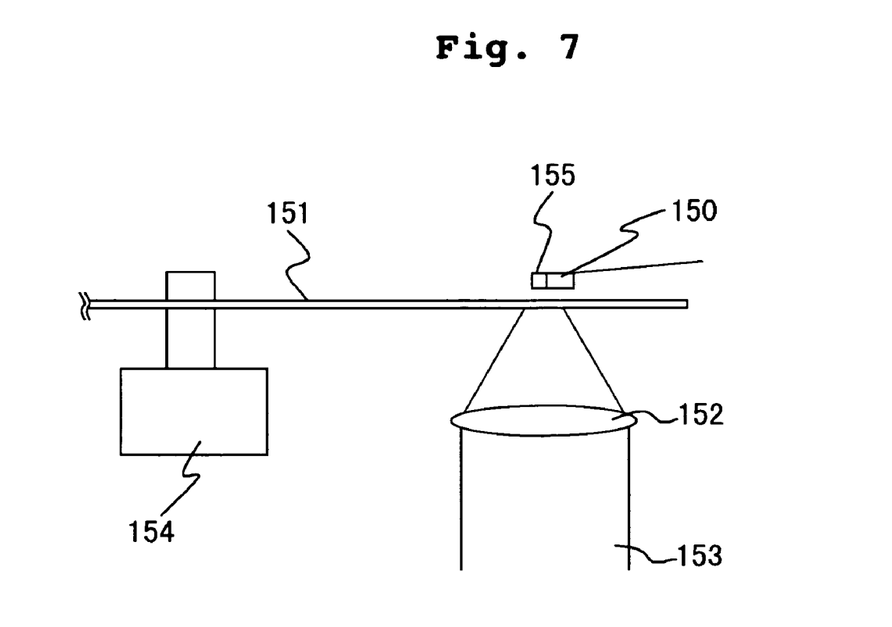
FIG. 7 is a conceptual view of another recording and reproducing apparatus embodying the present invention.
Figure 8:
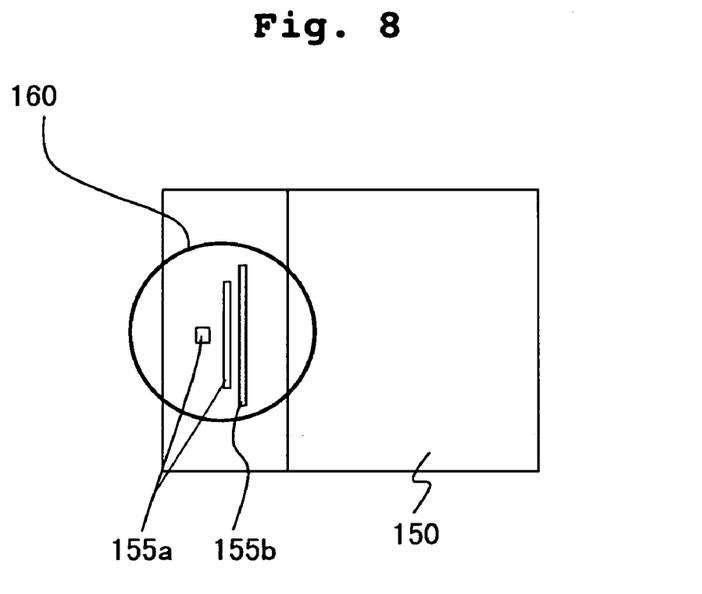
FIG. 8 is a conceptual view showing the dimensional relationship between the light spot formed on the information recording medium by the objective lens in the apparatus shown in FIG. 7 and the magnetic head mounted on the slider in this apparatus.
Figure 9:
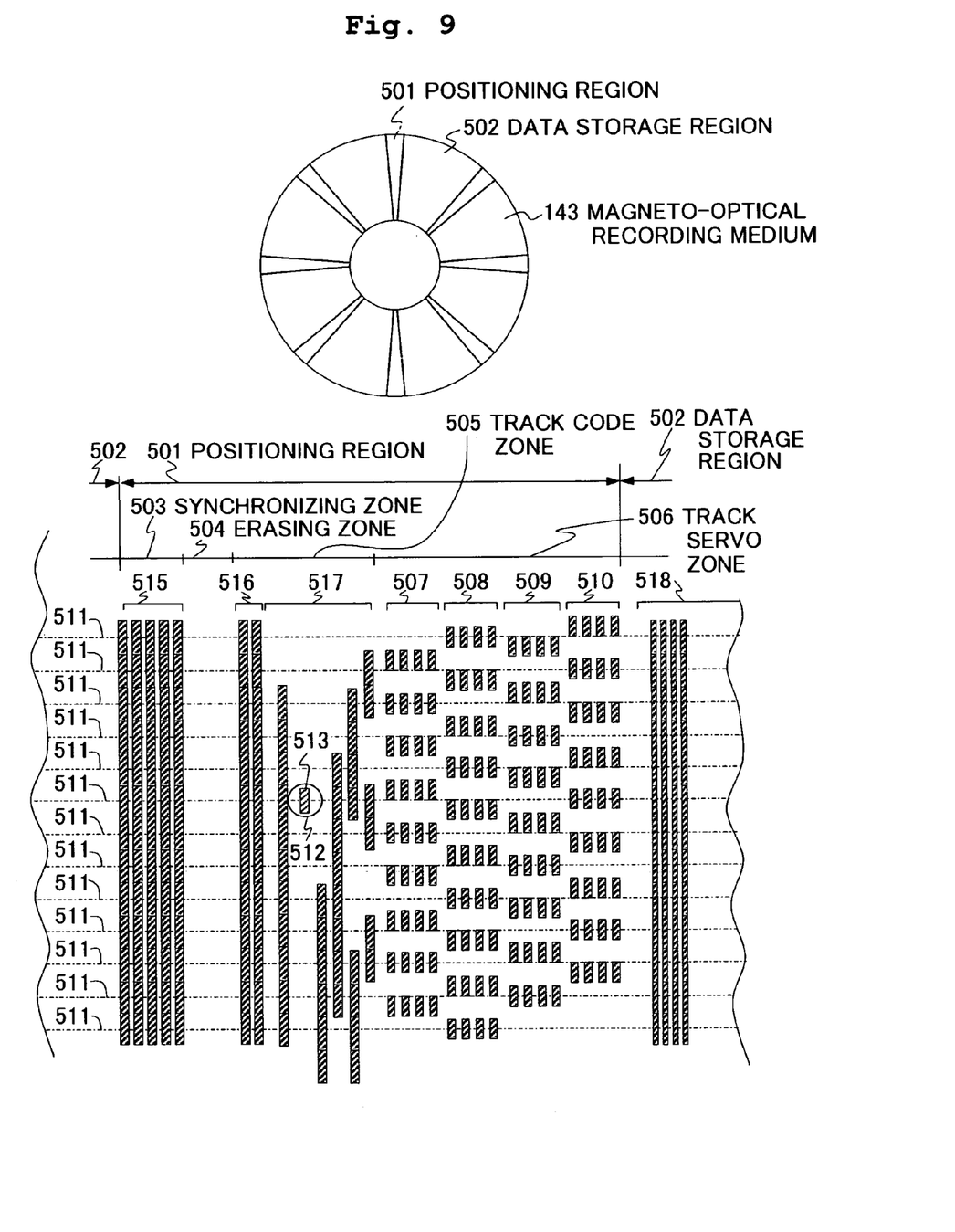
FIG. 9 shows, for comparison with FIG. 5, the shapes of magnetic marks recorded by the apparatus shown in FIG. 7.

Differently from the structure shown in FIG. 1, the optical and magnetic heads of the recording and reproducing apparatus may be independent of each other. In this case, as shown in FIG. 7, the recording and reproducing apparatus may include an optical head including an objective lens 152. This apparatus may also include a slider 150 fitted with a magnetic head 155. The optical head may be positioned in alignment with the magnetic head 155 with a recording medium 151 interposed between them. As shown in FIG. 8, the magnetic head 155 may include a recording magnetic head 155a and a reproducing magnetic head 155b which are integral with each other. The two magnetic heads 155a and 155b have a common magnetic pole. As shown in FIG. 8, the magnetic heads 155a and 155b may be so sized as to be covered by the light spot 160 radiated from the optical head onto the recording medium 151. This enables the size of the magnetic marks formed on the recording medium 151 to depend on the magnetic field applied by the magnetic head 155. Accordingly, the magnetic marks can be rectangular as shown in FIG. 9, not in feather or wing form as shown in FIGS. 2, 3 and 5. The rectangular form or shape is more advantageous for high density recordation on the recording medium 151. By making (the magnetic field generator and the detecting end of) the magnetic head 155 smaller in size than the light spot 160 as stated above, it is easy to align the optical and magnetic heads with each other.

The information recording medium according to the present invention has servo marks and management information which are formed as magnetic marks. This needs no pit pattern in the substrate of the recording medium, making it possible to keep the whole medium flat. This makes it possible to stably float a slider on which an optical head and/or a magnetic head are/or mounted. Therefore, even if the slider floats and travels at a low height from the information recording medium, substantially no head crash occurs. It is consequently possible to reliably reproduce the magnetic leakage field leaking from a minute record mark. This makes high density recording possible.

On the basis of the magneto-optical signal and the magnetic leakage field from a magnetic mark formed on an information recording medium, it is possible to align the optical head, the recording magnetic head and the reproducing magnetic head of the recording and reproducing apparatus according to the present invention with a track of the medium. Therefore, this apparatus is very suitable as a recording and reproducing apparatus for the information recording medium according to the invention.

What is claimed is:

1. A recording and reproducing apparatus for recording information on and reproducing information from an information recording medium including a substrate without pit patterns and a magnetic layer provided on the substrate, the magnetic layer having a servo pattern and management information recorded thereon as magnetic marks, the recording and reproducing apparatus comprising:
    an optical head for irradiating the information recording medium with light during information recordation;
    a recording magnetic head for applying a recording magnetic field to the information recording medium;
    a reproducing magnetic head for detecting magnetic leakage fields from the magnetic marks on the magnetic layer during information reproduction;
    a first positioner for positioning the optical head and the recording magnetic head at a target track of information recording medium on the basis of magneto-optical signals from the magnetic marks; and
    a second positioner for positioning the reproducing magnetic head at the target track during information reproduction, with the reproducing magnetic head using the detected magnetic leakage fields leaking from the magnetic marks to position the reproducing magnetic head.

2. The recording and reproducing apparatus defined in claim 1, wherein the first positioner includes:
    a detector for detecting light from the magnetic marks;
    a first control signal generator for obtaining positional information about the optical head and the recording magnetic head from detected signals from the magnetic marks detected by the detector, and generating a control signal for positioning the optical and recording magnetic heads at the target track; and
    an actuator for moving the optical head and the recording magnetic head to the target track on the basis of the control signal.

3. The recording and reproducing apparatus defined in claim 1, wherein the second positioner includes:
    a second control signal generator for obtaining positional information about the reproducing magnetic head from signals from the magnetic marks detected by the reproducing magnetic head, and generating a control signal for positioning the reproducing magnetic head at the target track; and
    an actuator for moving the reproducing magnetic head to the target track on the basis of the control signal from the second control signal generator.

4. The recording and reproducing apparatus defined in claim 1, and further comprising a slider for floating over the information recording medium, the slider including the optical head and the recording and reproducing magnetic heads.

5. The recording and reproducing apparatus as defined in claim 1, wherein the reproducing magnetic head is an MR head or a GMR head.

6. The recording and reproducing apparatus as defined in claim 1, wherein the optical head includes a solid immersion lens.

7. The recording and reproducing apparatus as defined in claim 1, wherein the optical head and the recording and reproducing magnetic heads are positioned on the same side of the information recording medium.

8. The recording and reproducing apparatus as defined in claim 1, wherein the optical head is positioned on one side of the information recording medium while the recording and reproducing magnetic heads are positioned on the other side.

9. The recording and reproducing apparatus as defined in claim 1, wherein the recording and reproducing magnetic heads include a magnetic field generator and a magnetic field detector, respectively, the radiation of light from the optical head forming a light spot on the information recording medium, the light spot being larger than the magnetic field generator and the magnetic field detector.

10. The recording and reproducing apparatus as defined in claim 1, wherein the magnetic marks are rectangular.

11. A method for positioning an optical head, a recording magnetic head and a reproducing magnetic head at a predetermined track of an information recording medium including a substrate and a magnetic layer without recording pits provided on the substrate, the magnetic layer having magnetic marks recorded thereon which represent a servo pattern and management information, the method comprising the steps of:
    irradiating the information recording medium with a laser beam to detect magneto-optical signals from the magnetic marks, and controlling the positions of the optical head and the recording magnetic head on the basis of the detected magneto-optical signals, during information recordation; and
    detecting magnetic leakage fields leaking from the magnetic marks with the reproducing magnetic head, and controlling the position of the reproducing magnetic head using the detected magnetic leakage fields, during information reproduction.

12. The method defined in claim 11, wherein the optical head and the recording and reproducing magnetic heads are positioned on the same side of the information recording medium.

13. The method defined in claim 11, wherein the optical head is positioned on one side of the information recording medium while the recording and reproducing magnetic heads are positioned on the other side.

14. The method defined in claim 4, wherein the optical head irradiates the information recording medium with light and form a light spot on the medium, the recording and reproducing magnetic heads including a magnetic field generator and a magnetic field detector, respectively, the light spot being larger than the magnetic field generator and the magnetic field detector.

15. The method defined in claim 11, wherein the magnetic marks are rectangular.

* * * * *